Figure 1:
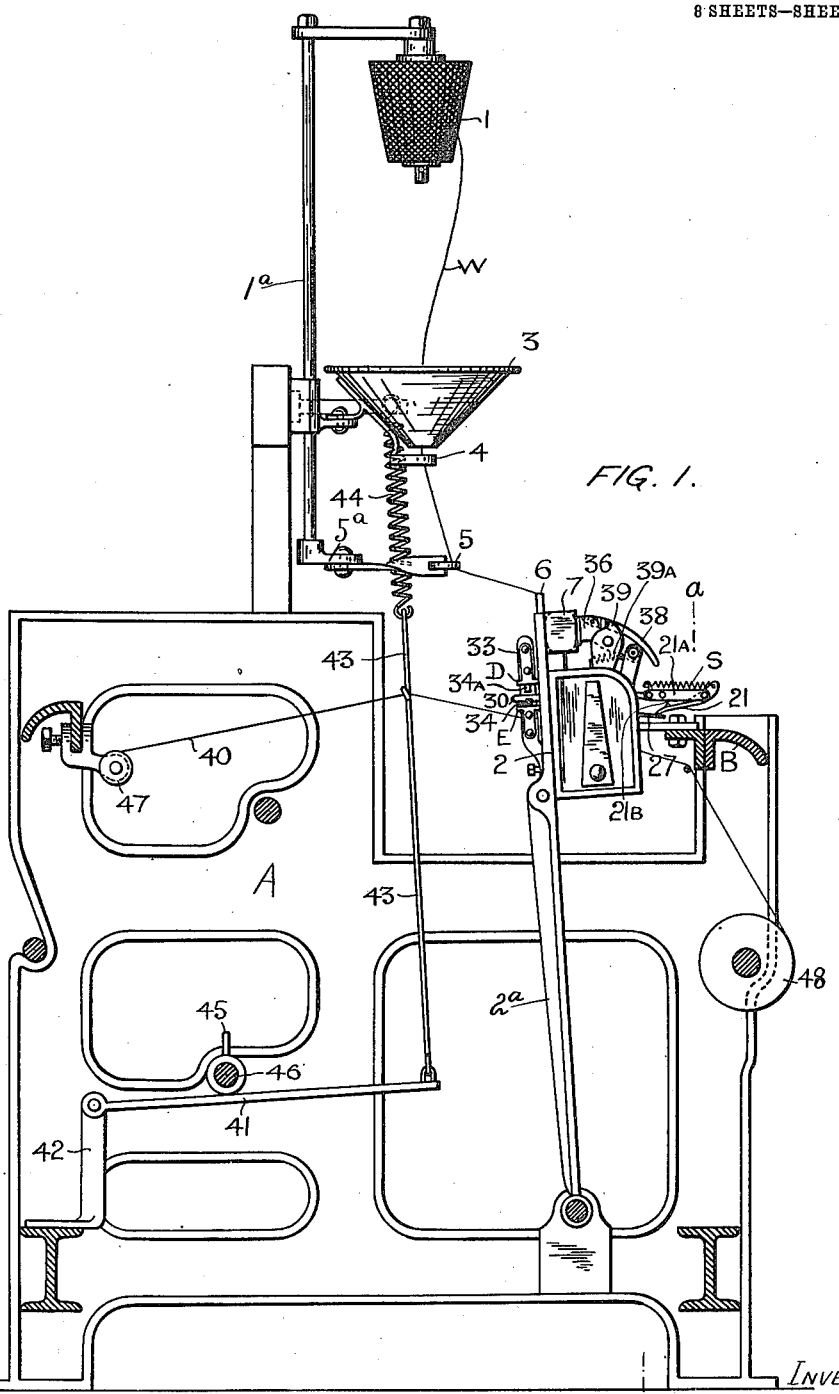

E. SMITH.
SHUTTLELESS LOOM FOR WEAVING.
APPLICATION FILED JULY 8, 1907.

948,945.

Patented Feb. 8, 1910.
8 SHEETS—SHEET 1.

ATTEST

INVENTOR.
EDWARD SMITH,
ATTY'S.

E. SMITH.
SHUTTLELESS LOOM FOR WEAVING.
APPLICATION FILED JULY 8, 1907.

948,945.

Patented Feb. 8, 1910.
8 SHEETS—SHEET 3.

ATTEST.
Bent. M. Stahl.
Edward N. Sartor.

INVENTOR.
EDWARD SMITH.
BY Shear Middleton
Donaldson Shear
ATTYS.

E. SMITH.
SHUTTLELESS LOOM FOR WEAVING.
APPLICATION FILED JULY 8, 1907.

948,945.

Patented Feb. 8, 1910.
8 SHEETS—SHEET 4.

ATTEST
Bent. M. Stahl.
Edward N. Saxton.

INVENTOR
EDWARD SMITH.
By Fran Middleton Donaldson Fran
ATTY'S

E. SMITH.
SHUTTLELESS LOOM FOR WEAVING.
APPLICATION FILED JULY 8, 1907.
948,945.
Patented Feb. 8, 1910.
8 SHEETS—SHEET 5.
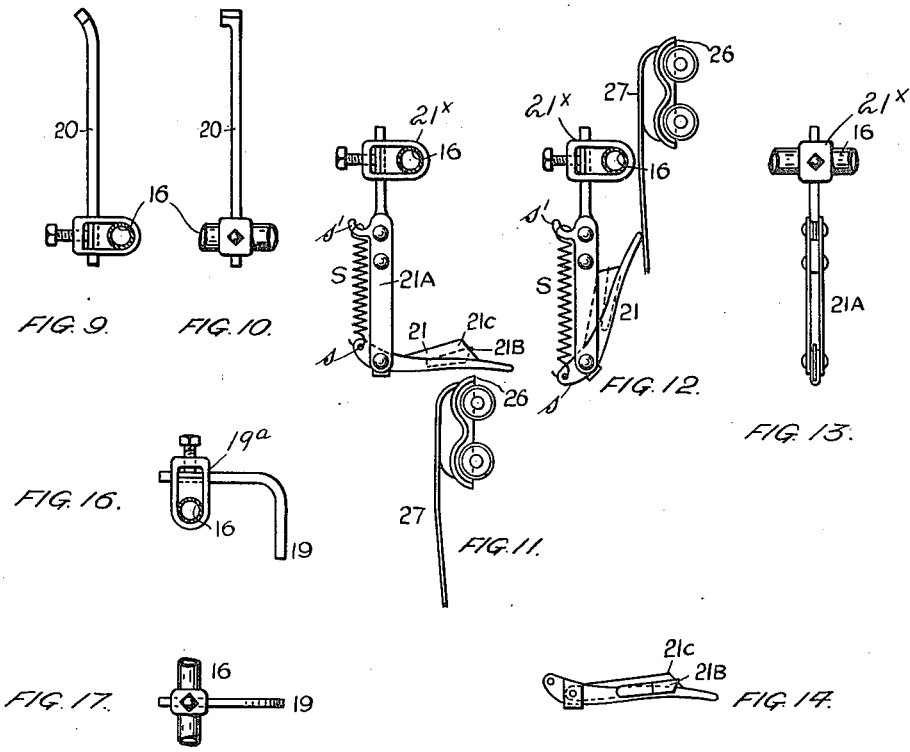
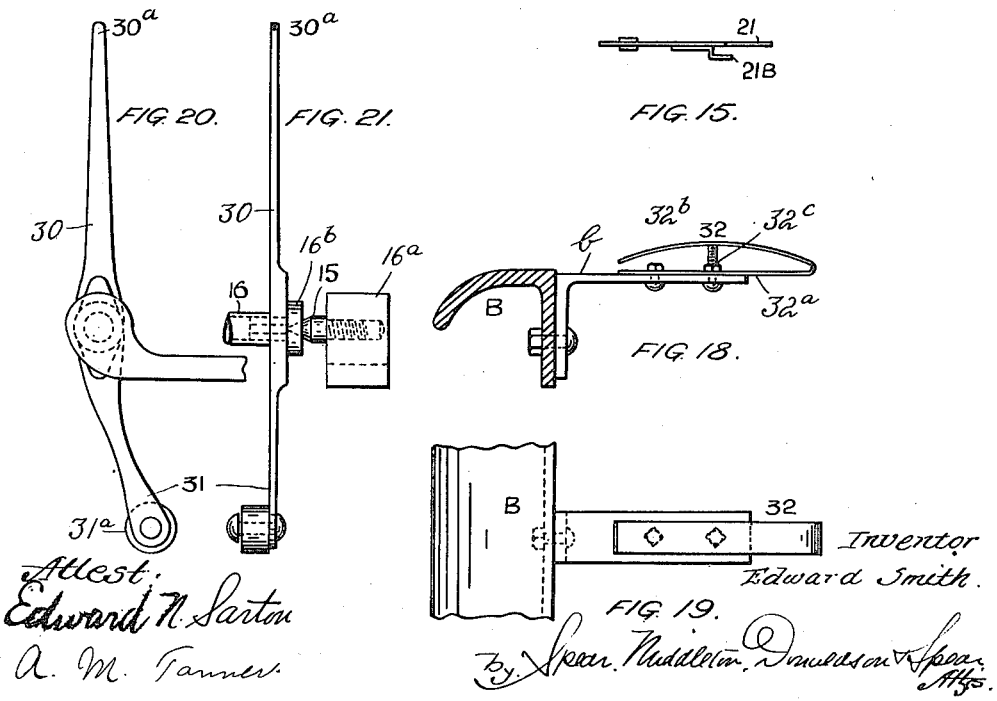
Inventor
Edward Smith.

E. SMITH.
SHUTTLELESS LOOM FOR WEAVING.
APPLICATION FILED JULY 8, 1907.
948,945.
Patented Feb. 8, 1910.
8 SHEETS—SHEET 6.
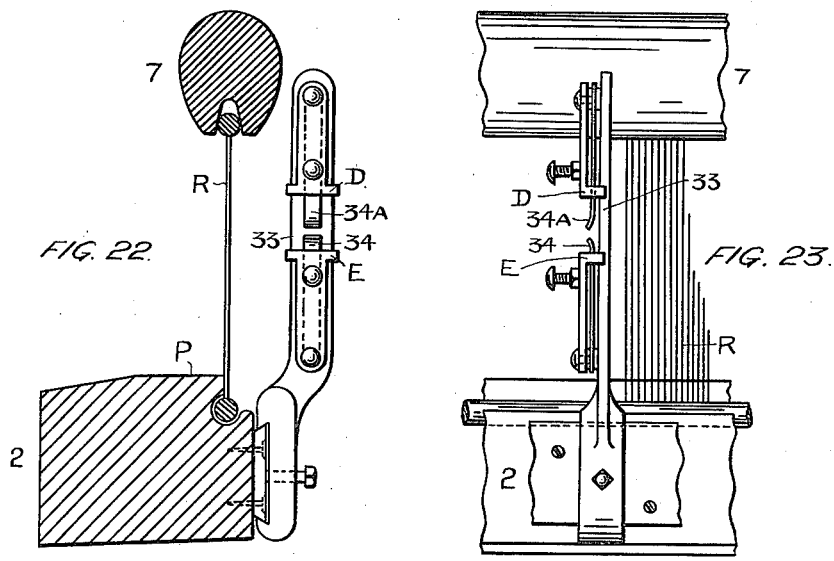
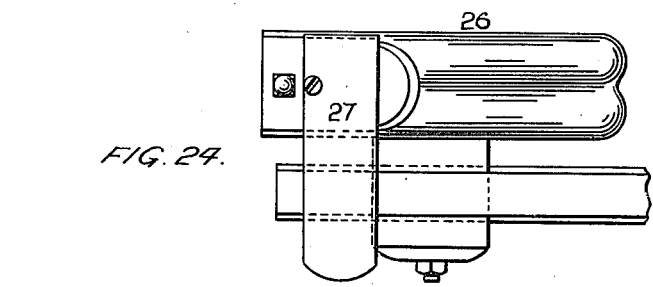
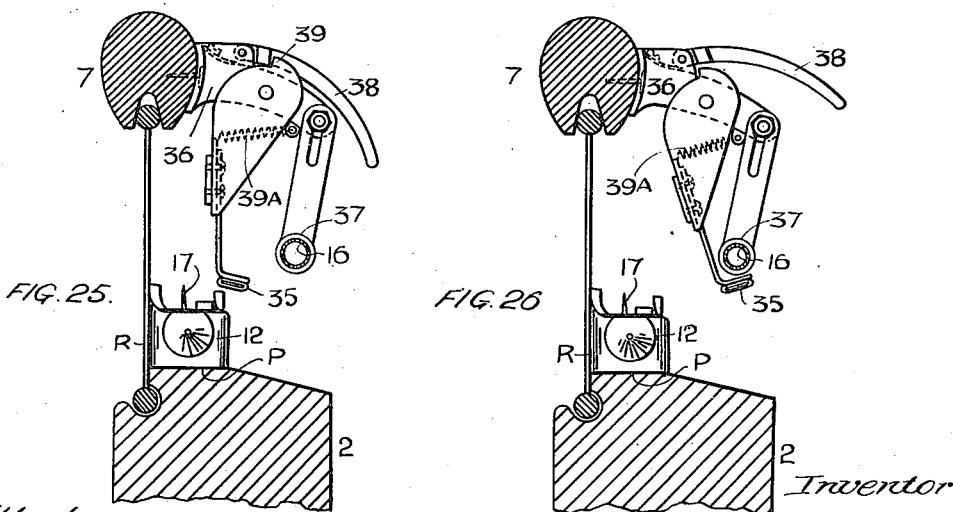

E. SMITH.
SHUTTLELESS LOOM FOR WEAVING.
APPLICATION FILED JULY 8, 1907.

948,945.

Patented Feb. 8, 1910.
8 SHEETS—SHEET 7.

Attest:
Edward N. Sartou
L. M. Tonner

Inventor:
Edward Smith
by Spear, Middleton, Donaldson & Spear
Attys

E. SMITH.
SHUTTLELESS LOOM FOR WEAVING.
APPLICATION FILED JULY 8, 1907.
948,945.
Patented Feb. 8, 1910.
8 SHEETS—SHEET 8.
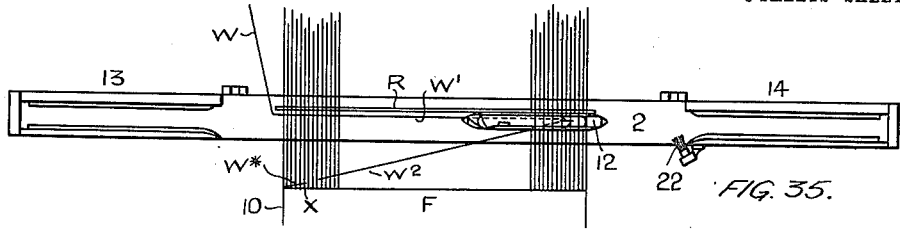
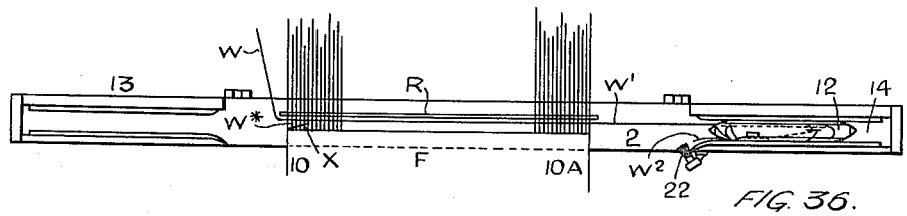
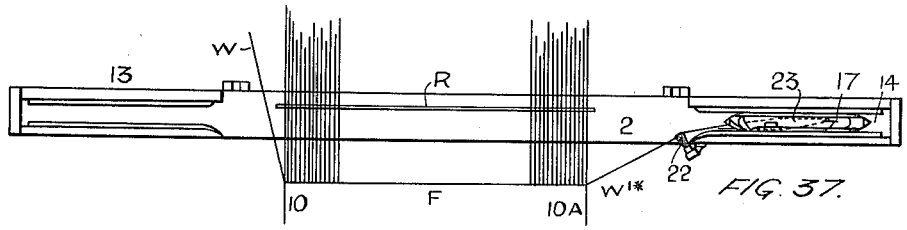
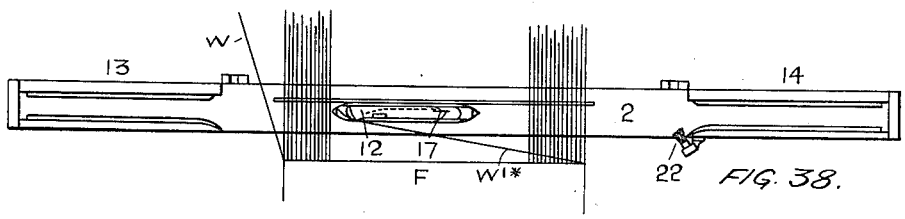
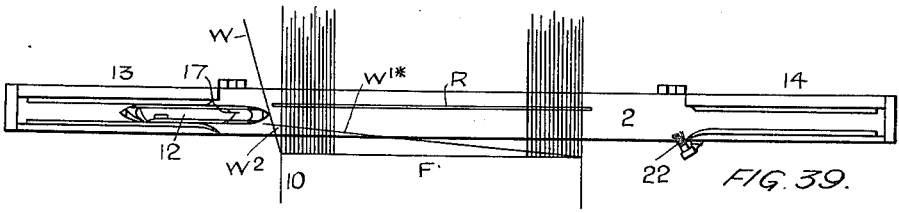
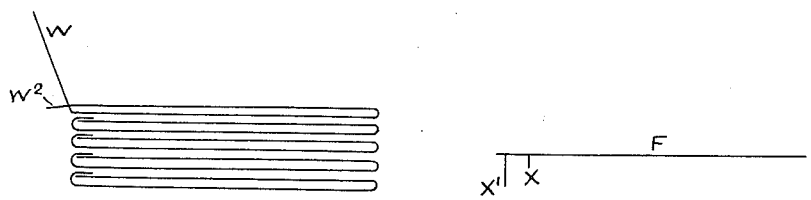

UNITED STATES PATENT OFFICE.

EDWARD SMITH, OF BRADFORD, ENGLAND.

SHUTTLELESS LOOM FOR WEAVING.

948,945. Specification of Letters Patent. Patented Feb. 8, 1910.

Application filed July 8, 1907. Serial No. 382,693.

*To all whom it may concern:*

Be it known that I, EDWARD SMITH, a subject of the King of Great Britain and Ireland, residing at 178 Garnett street, Bradford, in the county of York, England, have invented certain Improvements in and Relating to Shuttleless Looms for Weaving, of which the following is a specification.

The object of this invention is to combine with the ordinary types of looms, such as are commonly used in the weaving of cotton, worsted and like fabrics, additional mechanism constructed and applied, so that the weft is positively and automatically drawn from an outside supply by a carrier when picked in one direction across the loom, the carrier being constructed so as to operate mechanism by which the weft is cut into measured lengths of about double the width of fabric, and to lay one half of said cut weft across the "shed" of warp during one pick, leaving the second half clear of the warp, to be laid in the next warp "shed" on the return of carrier to the weft supply side of loom; also to insert the weft in such a way that, fast selvages are formed on each edge of the fabric, and for each end of the cut weft to be forced outside the fabric, into a position clear of the selvage for effectually removing the weft ends.

To accomplish my object, a loom of the ordinary type may be utilized, and connected therewith is mechanism arranged substantially as hereinafter described and illustrated by the accompanying drawings, of which:—

Figure 2:
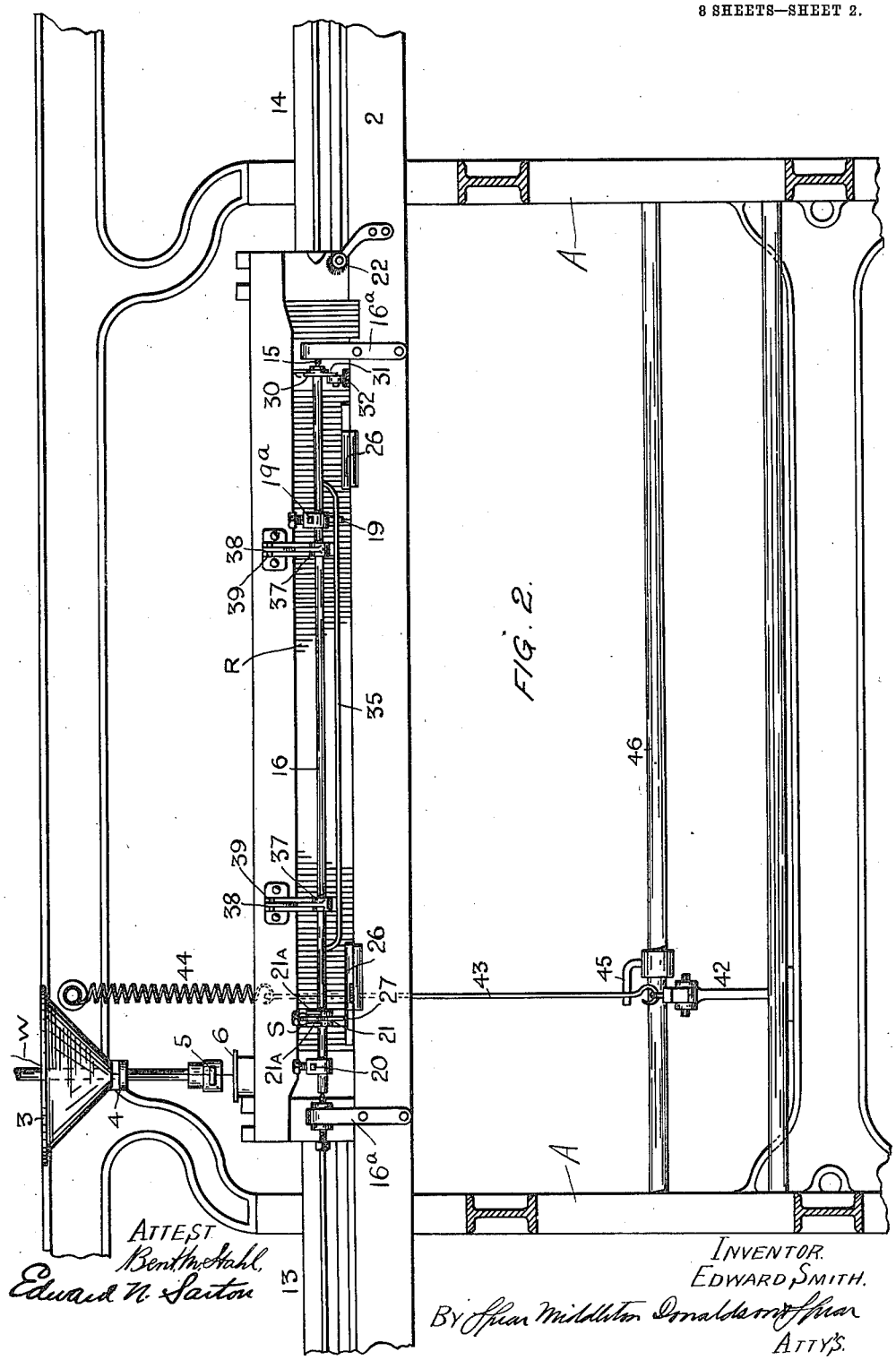
Figure 3:
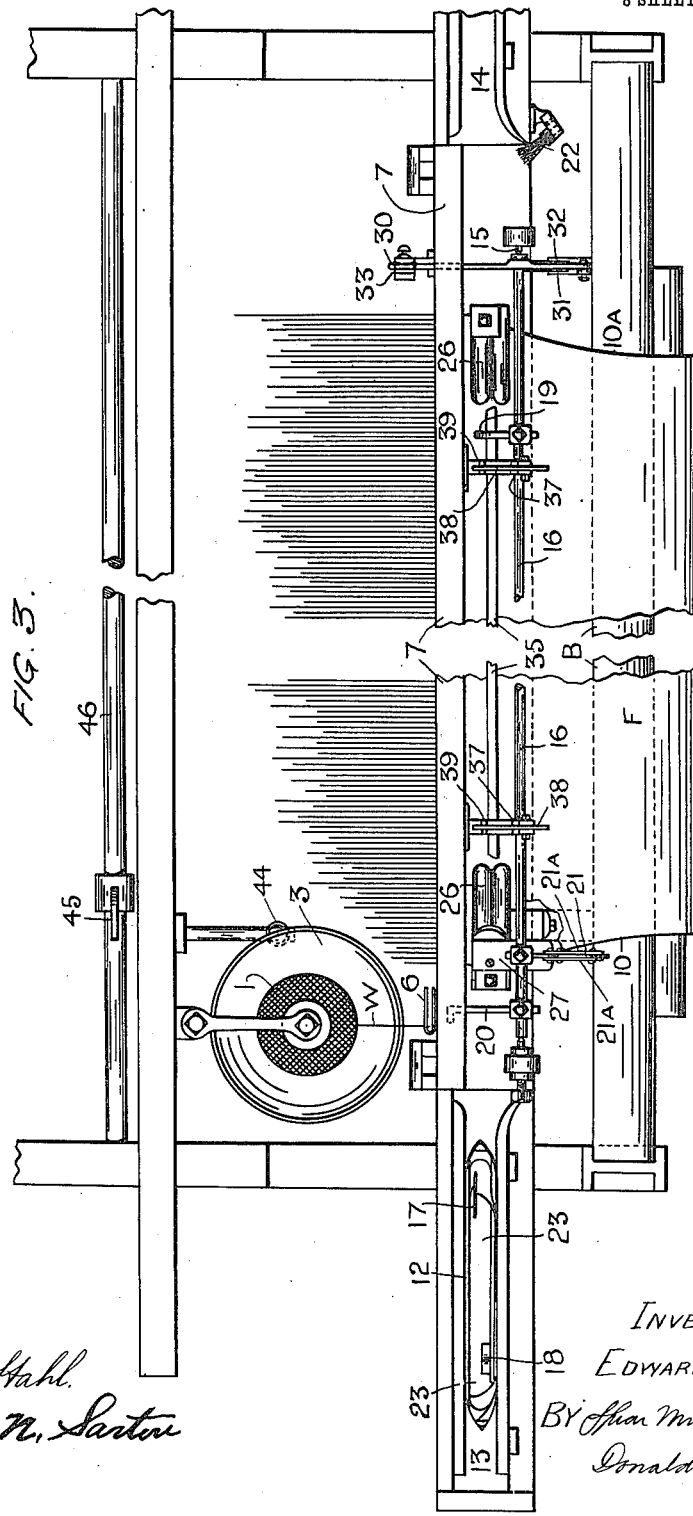
Figure 4:
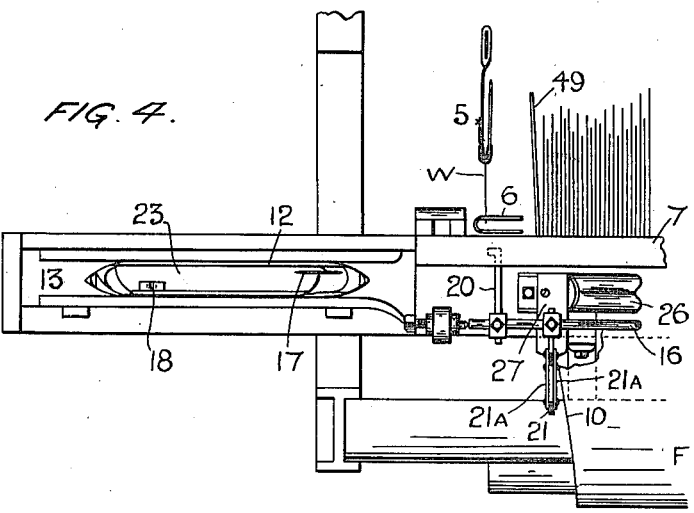
Figure 5:
Figures 6, 7, 8:
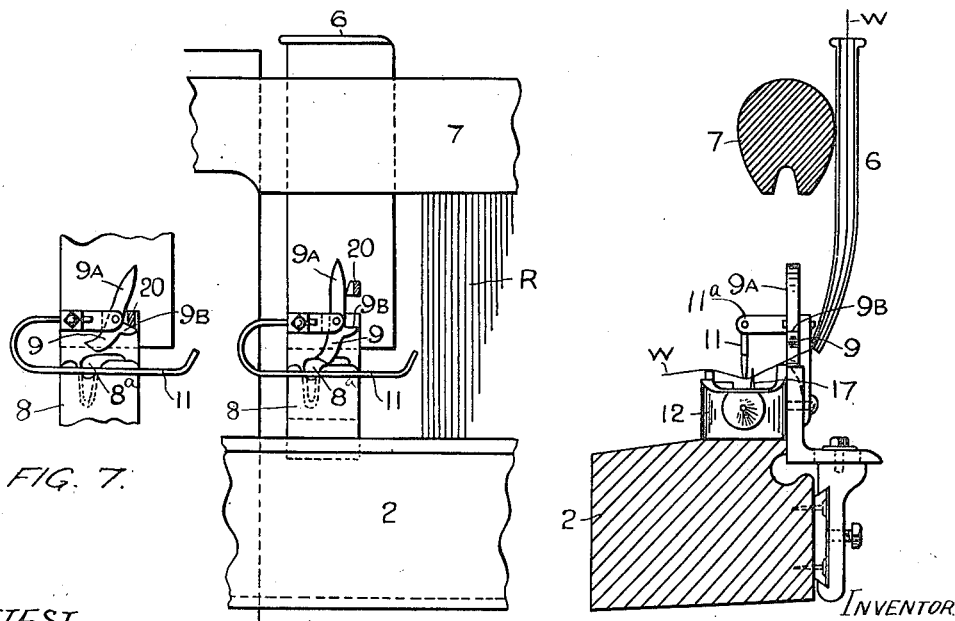
Figure 27:
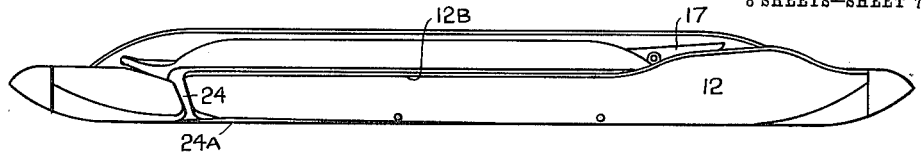
Figure 28:
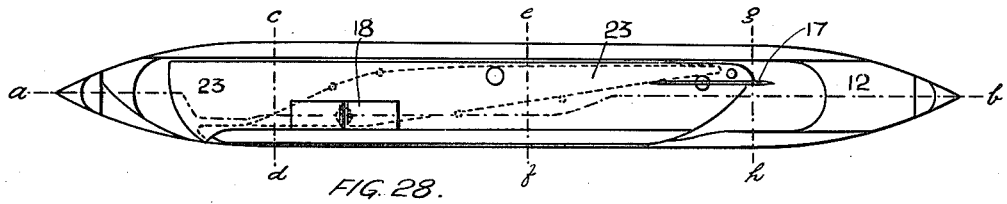
Figure 29:
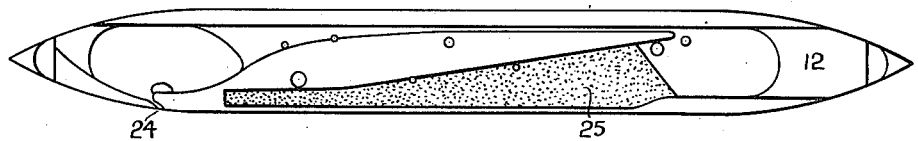
Figure 30:
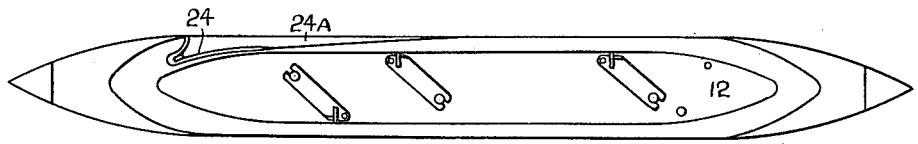
Figure 31:
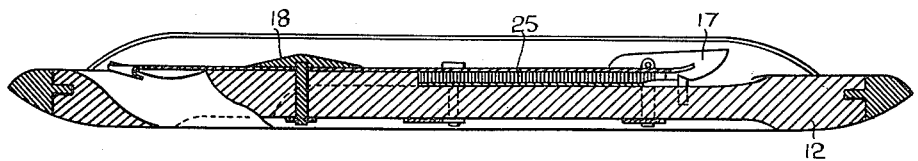
Figure 32:
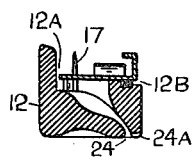
Figure 33:
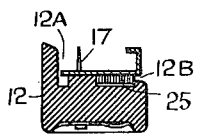
Figure 34:
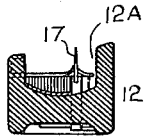

Figure 1. represents a sectional end elevation of portions of a loom considered necessary for explaining my invention shown applied to a right hand loom; the end frame is removed for more clearly showing the application of the invention. Fig. 2. is a front sectional elevation through line, *a. b.* of Fig. 1. Fig. 3. is a plan showing certain portions of loom, with my improvements applied. Fig. 4. is a detail plan showing means employed for keeping the weft ends clear of the selvage. Fig. 5. represents a plan of a weft guide and tension device. Fig. 6. the front elevation of a weft gripper secured to lay beam. Fig. 7. is a detached elevation of weft gripper shown open for allowing the weft to pass, and Fig. 8 is a section through lay beam, showing the weft held in a position for the carrier to engage therewith. Figs. 9 and 10. are detail views at right angles to each other of an arm utilized for operating the weft gripper for holding and releasing the weft as required by the weaving operations. Figs. 11 and 12. are detail views showing the weft cutter and attachments in two positions. Fig. 13 is a plan with spiral spring removed, and Figs. 14 and 15 are views of the cutter detached from support, in front and side elevation respectively. Figs. 16 and 17. represent a side elevation and plan of a feeler forming part of the measuring device. Figs. 18 and 19. are a side elevation and plan of a spring appliance for placing the feeler and other attachments on oscillating bar, in their required positions before the return of the lay beam, after each laying of weft is beat up. Figs. 20 and 21. represent the side elevation and plan of an arm attached to oscillating bar, adapted to work in conjunction with before mentioned spring appliance. Figs. 22 and 23. represent the side and back views of oscillating bar steadying device. Fig. 24. is a plan of an ordinary temple provided with a path for controlling the position of weft cutter in relation to warp threads and fabric. Figs. 25 and 26. are cross sectional elevations of lay beam, showing the weft carrier guide in the position when loom is working, and when open for removing the carrier. Fig. 27. is a side elevation of weft carrier. Figs. 28 and 29 are plans, the former showing the cover plate and inclined striking plate utilized for operating the feeler of weft measuring device; in Fig. 29. the cover plate and inclined striking plate are removed. Fig. 30. is a view showing underside of weft carrier. Fig. 31. is a longitudinal sectional elevation through irregular dotted line *a. b.* of Fig. 28, and Figs. 32 and 33 are cross sections on lines *c—d* and *e—f*, respectively, of Fig. 28, looking toward the right, and Fig. 34 is a similar section on line *g—h* looking toward the left. Fig. 35. represents a diagrammatic plan showing the position of weft carrier and weft thread immediately after the weft has been cut from the outside supply. Fig. 36. is a similar plan showing the weft carrier in right hand box, with the uncut portion of weft thread from source of supply extending across fabric to carrier, ready to be beat up by the reed. Fig. 37. shows the weft connected to each selvage after the last insertion is beaten up and secured. Fig. 38. shows the carrier on its return flight laying the second or return pick of weft across the fabric. Fig. 39. shows the carrier entering box after laying out the return pick, ready for the next beat up of lay beam. Fig. 40. shows the weft as laid and secured in the fabric, also a portion of the weft connection from fabric to source of supply, and Fig. 41. is an edge view of the fabric, showing the cut ends of weft forced to the underside.

Referring by reference characters to this drawing, the letter A designates the supporting frame of the loom which, except in the particulars hereinafter specified, may be of the ordinary or any desired construction. The lay beam is shown at 2, mounted upon lay swords $2^a$, the operating mechanism therefore being omitted for clearness of illustration as it forms no part of the present invention. Above the lay beam is located a hand rail 7, shown more clearly in Figs. 22, 23, 25 and 26, between which and the lay beam is located the usual reed R for beating up the weft. At opposite ends of the lay beam are located boxes 13 and 14 which are designed to receive a carrier 12 which is driven back and forth across the lay beam from one box to the other at suitable intervals by suitable picker mechanism which is omitted from the drawings for clearness of illustration as it forms no part of this invention. This carrier contains no weft carrying spindle as does the ordinary shuttle, but draws the weft from a supply cone 1 carried by a standard $1^a$ near one end of the loom. From this cone the weft shown at W passes down through a suitable guiding funnel 3 beneath which are located brushes 4 adapted to bear on the weft as it issues from the funnel and impart the requisite tension thereto. Below the brushes is a slotted guide 5, carried by a bracket $5^a$ projecting from the foot of the standard $1^a$, and from this guide the weft passes to a conduit 6 carried by a bracket 8 mounted on the lay beam, as shown in detail in Figs. 6 and 8. The bracket is provided with an opening $8^a$ in line with the lower end of the conduit for the passage of the weft, and with a yielding depresser bar or spring 11 carried by an arm $11^a$ projecting from the bracket as shown in Figs. 6 and 8, designed to press the weft down into position for engagement by the weft carrier 12 in its travel from box 13 to box 14.

Pivotally mounted on the bracket 8 is a gripper lever 9 which, at the proper time, is adapted to be operated to grip the weft to hold it against being drawn through the guide 6. This gripper lever has an upwardly inclined arm $9^a$ and a shoulder $9^b$ designed for engagement with a horizontally disposed arm 20 as shown in Figs. 6 and 7. When the arm is depressed, it bears on the shoulder $9^b$ and holds the lever 9 out of engagement with the weft, but when said arm rises it bears against the inclined face of portion $9^a$ and forces the gripper lever into gripping position, as indicated in Fig. 6. This gripper lever is mounted upon an oscillating rod 16, see Figs. 2 and 3, which is journaled in brackets $16^a$ carried by the lay beam 2.

The rod 16 may conveniently be made hollow as indicated in Fig. 21 and have each end fitted with a hollow plug $16^b$, provided with a conical recess to receive the pointed or cone-shaped end of the pin 15, the shank of which is screwed into a threaded recess in the bracket $16^a$, as indicated in dotted lines in said figure.

As the weft carrier travels from box 13 to box 14, it draws a doubled length of the weft through the warp threads (not shown) or a length equal to twice the width of the fabric. This weft should be severed from the preceding weft thread by the time the carrier has reached box 14 and to accomplish this I provide a cutter device 21 operated by the oscillation of the rod 16 as hereinafter described. On the rock shaft or rod 16 is a feeler bar 19, secured by a suitable clamping device $19^a$ and the end of this feeler bar depends into a position to be struck and raised by an incline or cam plate 18 carried by the shuttle carrier, see Fig. 31. This causes the rod 16 to be rocked on its axis by which action arm 20 is raised causing the gripper to grip the weft and prevent any more being drawn while it is being severed by the cutter device. This cutting device comprises a frame $21^a$ (see Figs. 11 to 13) which is secured at one end by a suitable clamping device $21^x$ to the rod 16. In the opposite end of the frame is pivoted a knife 21 to the end $s$ of which is connected a spring S, the other end of which is attached to a lug $s'$ on the frame $21^A$. The spring thus tends to cause the knife to assume the position shown in Fig. 11, when the lay beam is in its backward position and the warp shed open for the movement of the carrier. When bar 16 is actuated as before described, the knife 21 then between the warp threads is further depressed, bringing the end of the angular plate $21^B$ and cutting edge $21^C$ of knife into contact with the weft just inserted. The knife in its continued downward movement, cuts the weft a short distance from selvage 10, see Fig. 35, the angular plate $21^B$ holding the weft tight against the warp threads while it is being cut, and then when severed forcing the extreme end X to the underside of fabric, the remainder of said end of weft indicated by W* passes to and around selvage 10, and is secured along with the uncut portion W' shown in front of reed R in Figs. 35 and 36, at the next beat up of lay beam.

After weft W is cut as described, carrier 12 continues its course to box 14, drawing the loose end $W^2$ in Fig. 35 clear of the warp threads and fabric F, as shown by Fig. 36. The carrier on entering box 14, draws cut portion $W^2$ of weft across brush 22, causing the weft to pass through a slit $12^B$ on one edge of carrier, to the underside of cover plate 23, and after weft $W'$ and short end $W^*$ are beaten up and secured by the shedding of the warp threads, a weft connection $W^{1*}$ is left between selvage $10^A$ and carrier, as shown by Fig. 37. A portion of this length is beneath cover plate 23, as shown by dotted lines. When weft carrier is picked out of box 14, weft $W^{1*}$ is drawn into slit 24 of carrier, and tension on the weft for insuring it being delivered straight across the warp is obtained by drawing the weft over a brushlike surface 25, embedded in the carrier below the cover plate 23. As carrier 12 travels from box 14 to box 13, weft $W^{1*}$ leaves carrier through bottom of slit 24, a depression $24^a$ being made in base of carrier sufficiently deep and of a width for the carrier to pass over and be clear of the weft as it is delivered through slit 24. When carrier 12 arrives in box 13, weft $W^{1*}$ is then beaten up on the forward movement of reed R, and is secured by the shedding of the warp threads operated in the usual manner, after which the cycle of operations is repeated. The loose end $W^2$ of weft $W^{1*}$ terminates outside the selvage 10 of fabric F, see Fig. 39, and is forced to the underside of fabric in the manner as hereinafter described; the portion forced to the underside is indicated by $X'$ in Fig. 41.

When carrier 12 is struck back from box 14 to box 13, the reverse incline of plate 18 on said carrier will strike end of feeler 19, and operate bar 16 and attachments, but as there is no weft laid across the warp threads with which knife 21 can come in contact during the return pick of carrier, the operation of bar 16 and knife have no effect on the weft.

When the lay beam is in its backward position and warp "shed" open for allowing carrier to distribute the weft across the warp "shed," knife 21 is then in the position shown by Fig. 11 to clear the temple cover 26, spring S by its contraction drawing the back of knife against what is termed the "feeling edge" of fabric, that is to say, against the weft last inserted between the warp threads, and when the lay beam is in its forward position beating up the weft, the knife is clear of the fabric and supported by cover plate 27, as shown by Fig. 12.

Near to one end of bar 16 is secured a double ended arm or lever, one portion 30 projecting toward the lay beam. When carrier 12 arrives in box 14, reed R is approaching the position for beating up the weft just delivered, and the rear end 31 of lever is sliding over a curved spring plate 32 supported by an attachment to breast beam B of loom.

By the rear end 31 of lever passing over the curved plate 32, bar 16 is moved into the position by which arm 20, secured to said bar, is caused to strike projection $9^B$ of pivoted gripper, by which operation the foot 9 is moved from the position shown by Fig. 6 to that shown by Fig. 7, thereby liberating the weft so as to be freely drawn from cone 1 by the carrier engaging therewith as before described when traveling toward box 14.

For the purpose of insuring a definite oscillating movement of bar 16 and thus preventing the cutting of weft W until a proper length has been drawn from the supply cone 1, bar 16 is steadied by end 30 of arm engaging between plate 33 and spring 34 when moved in one direction, and between said plate and spring $34^A$ when moved in the other direction, by which movements and engagements rebounding is prevented.

The projections D and E act as stop pieces for adjusting the movements and for placing the end of feeler 19 in a different position as regards distance above the weft carrier path P of lay beam, and therefore in proper relation to the path for the feeler to engage with the inclined surfaces of plate 18 on carrier 12 before each picking of carrier.

A guide 35 is suitably attached by brackets 36 to hand rail 7, and suspended above the warp threads in a manner that the upper sections of said threads when the warp "shed" is open, are in contact with said guide, which is applied for the purpose of guiding and retaining the weft carrier in contact with path P of lay beam 2, and reed R when traveling between the boxes 13 and 14, so that the carrier may rise above the path P, and the inclined surfaces of plate 18 operate feeler 19 before the requisite time, and thereby cause a shorter length of weft to be cut by the premature operation of knife 21 as the weft carrier is passing from box 13 to box 14.

In order to give rigidity to bar 16 and thereby make the cutting of the weft more definite as regards length; an additional support is given to said bar by journal 37 attached to bracket 36 in a convenient manner, the guide being held in the position shown by Fig. 25 by the engagement of pivoted lever 38 with notch 39 cut in arm carrying guide 35. On raising lever 38 clear of notch 39, the guide 35 is moved into the position shown by Fig. 26, by the contraction of spring $39^A$ held in tension between attachments on bracket 36 and supporting arm of guide 35.

The shedding of the selvage warp threads is preferably of the double pick type, operated in the usual manner when weft carrier is in box 14, but in order to obtain a clear and firm selvage at 10, I introduce an additional thread 40 and operate same independently of the warp threads, for the purpose of forcing the overlying ends $W^2$ of weft to the underside of fabric, the same as the extreme end of weft $W^*$, effected in the manner as before described.

A bar 41 is supported at one end by a bracket and pin 42, and at the opposite end a wire is attached, the upper portion of which is connected to a spiral spring 44 suitably supported in tension. A hole is formed in wire 43 through which the additional thread 40 is passed; a tappet 45 is secured on revolving shaft 46, the tappet on each revolution forcing the end of bar 41 and connected wire 43 downward, and when liberated by tappet, the contraction of spring 44 raises the bar and wire to their normal position, as shown by Fig. 1.

The tappet 45 is so placed as to admit of spiral spring 44 holding the additional thread 40 above the carrier 12 until said carrier is returned from box 14 to box 13, and delivered the portion of weft $W^{1*}$ across warp "shed", see Fig. 39. Bar 41 is then depressed by tappet 45, and the additional thread 40 moved downward across loose end $W^2$ of weft lying within the "shed", by which movement the end $W^2$ is forced through the bottom "shed" of warp after the commencement of the backward movement of lay beam. The actuation of thread 40 is such that it is not woven into the fabric.

Thread 40 is drawn from a spool 47, see Fig. 1, and after passing through the hole in wire 43 as before mentioned, it is conducted through reed R and retained in contact with the upper surface of lay beam 2 by an eyelet or like guiding device secured to the upper edge or front surface of lay beam, then forward to the ordinary taking up beam 48, around which it is wound.

In order that the loose ends $W^2$ of weft may be retained on the underside of fabric so as not to come into contact with the selvage 10, a narrow tape 49, preferably of metal, see Fig. 4, may be placed close to said selvage, in the same plane as the warp threads of bottom "shed". One end of tape may be fixed to the temple frame or other convenient support, and the other end to a spiral spring held in tension by attachment to some rigid part of the loom.

What I claim is:—

1. In a loom for weaving, a carrier adapted to draw weft from an outside supply cone, means for cutting the weft between the selvages of fabric without severing the connection between supply cone and warp, substantially as described.

2. In a loom for weaving, a carrier adapted to draw weft from an outside supply, means for cutting the weft between the selvages combined with means for conveying the severed portion of weft clear of warp in a condition for insertion between the top and bottom warp "shed" substantially as described.

3. In a loom for weaving, means for supplying weft from outside of the weft carrier, a weft gripper 9, means for operating same, a depressor bar 11, and a weft carrier 12 provided with an angular plate 17 substantially as described.

4. In a loom for weaving, a weft gripper 9 with means for operating same, a depressor plate 11, a weft carrier 12 provided with an angular plate 17, means for cutting the weft and means for forcing the cut ends to the underside of fabric.

5. In a loom of the type described, an outside supply of weft, a carrier, an adjustable feeler 19 combined with oscillating bar 16, an arm 20 controlling the holding and liberating operations of gripper 9, a weft cutter 21, an arm 30 combined with springs 34 and $34^A$ and stop pieces D and E substantially as described.

In witness whereof I have hereunto subscribed my hand in the presence of two witnesses.

EDWARD SMITH.

Witnesses:
  NORMAN HACKETT,
  WILLIAM ILLINGWORTH.